(12) United States Patent
Bowers et al.

(10) Patent No.: US 10,539,172 B2
(45) Date of Patent: Jan. 21, 2020

(54) FASTENER WITH A STUD HOLD-OUT POSITION

(71) Applicants: Ned C. Bowers, Mount Dora, FL (US); Russell Ortner, Apopka, FL (US)

(72) Inventors: Ned C. Bowers, Mount Dora, FL (US); Russell Ortner, Apopka, FL (US)

( * ) Notice: Subject to any disclaimer, the term of this patent is extended or adjusted under 35 U.S.C. 154(b) by 329 days.

(21) Appl. No.: 15/679,722

(22) Filed: Aug. 17, 2017

(65) Prior Publication Data

US 2018/0320724 A1 Nov. 8, 2018

Related U.S. Application Data

(60) Provisional application No. 62/375,672, filed on Aug. 16, 2016.

(51) Int. Cl.
*F16B 21/18* (2006.01)
*F16B 21/04* (2006.01)
*F16B 5/10* (2006.01)
*F16B 5/02* (2006.01)

(52) U.S. Cl.
CPC ............ *F16B 21/04* (2013.01); *F16B 5/0208* (2013.01); *F16B 5/10* (2013.01)

(58) Field of Classification Search
CPC ......... F16B 21/04; F16B 5/0208; F16B 21/06
USPC .......................... 411/353, 550, 551, 549, 553
See application file for complete search history.

(56) References Cited

U.S. PATENT DOCUMENTS

| | | |
|---|---|---|
| 905,294 A | 12/1908 | DeGroff |
| 2,011,472 A | 8/1935 | Chobert |
| 2,283,526 A | 5/1942 | Albin |
| 2,486,411 A | 11/1949 | Huelster |
| 2,486,670 A | 11/1949 | Nigg et al. |
| 2,670,021 A | 2/1954 | Torresen et al. |
| 2,798,404 A | 7/1957 | Schaeffer |
| 2,858,156 A | 10/1958 | Wootton |
| 2,878,542 A | 3/1959 | Mills et al. |
| 2,881,499 A | 4/1959 | Mills et al. |
| 2,922,211 A * | 1/1960 | Boyd ........................ F16B 5/10 411/551 |
| 2,975,667 A | 3/1961 | Bross |

(Continued)

OTHER PUBLICATIONS

Alcoa, "2600/2700 Series. General Purpose Stud Assemblies" pp. 1 of 1 no date available.

*Primary Examiner* — Gary W Estremsky
(74) *Attorney, Agent, or Firm* — Beusse, Wolter, Sanks & Maire PLLC; Robert L. Wolter

(57) ABSTRACT

A fastener assembly (400), having: a grommet (402) for extending through an aperture (412) of a first element (408), the grommet including a perimetric wall (416) defining an opening through the grommet; a stud (404) including a head (422) at one end and a cross pin (424) adjacent to an opposite end, the stud being received in the opening of the grommet; a cup member (426) interposed between the stud and the grommet, the cup member being moveable relative to the stud and movable relative to the grommet; and a locking element (444, 448, 802) that is moveable relative to the grommet. In a secured configuration (438) the stud is relatively lowered with respect to the grommet and the locking element is disengaged from the grommet. In a holdout configuration (600) the stud is relatively raised with respect to the grommet and the locking element is engaged to the grommet.

20 Claims, 8 Drawing Sheets

(56) References Cited

U.S. PATENT DOCUMENTS

| | | | |
|---|---|---|---|
| 3,080,633 A * | 3/1963 | Reddy | F16B 21/04 |
| | | | 24/580.1 |
| 3,093,179 A * | 6/1963 | Zahodiakin | F16B 5/0208 |
| | | | 411/353 |
| 3,488,815 A | 1/1970 | Metz | |
| 3,495,307 A | 2/1970 | Metz | |
| 3,564,563 A * | 2/1971 | Trotter | F16B 5/10 |
| | | | 411/552 |
| 3,630,261 A | 12/1971 | Gley | |
| 3,675,280 A | 7/1972 | Winslade | |
| 3,827,110 A | 8/1974 | Dzus et al. | |
| 4,227,287 A | 10/1980 | Gunther | |
| 4,370,874 A | 2/1983 | Munn | |
| 4,378,615 A | 4/1983 | Gunther | |
| 4,387,497 A | 6/1983 | Gulistan | |
| 5,073,070 A * | 12/1991 | Chang | F16B 5/0208 |
| | | | 411/105 |
| 5,658,107 A | 8/1997 | Smith | |
| 5,688,093 A * | 11/1997 | Bowers | F16B 5/10 |
| | | | 411/544 |
| 5,690,460 A | 11/1997 | Attanasio | |
| 5,716,180 A | 2/1998 | Bowers | |
| 5,779,422 A * | 7/1998 | Petignat | B26B 13/285 |
| | | | 411/551 |
| 5,795,122 A | 8/1998 | Bowers | |
| 6,261,042 B1 | 7/2001 | Pratt | |
| 6,287,043 B1 | 9/2001 | Kraus | |
| 6,309,158 B1 * | 10/2001 | Bellinghausen | F16B 5/0208 |
| | | | 411/107 |
| 6,776,566 B2 | 8/2004 | Kobusch et al. | |
| 6,789,993 B2 | 9/2004 | Ozawa et al. | |
| 6,860,689 B1 | 3/2005 | Attanasio | |
| 7,210,885 B2 * | 5/2007 | Pinzl | F16B 37/005 |
| | | | 411/353 |
| 7,398,664 B1 | 7/2008 | Weinerman et al. | |
| 7,454,933 B1 | 11/2008 | Paige | |
| 7,462,008 B2 | 12/2008 | Attanasio | |
| 7,922,432 B2 * | 4/2011 | Chiu | F16B 5/0208 |
| | | | 411/107 |
| 7,997,843 B2 * | 8/2011 | Bowers | F16B 21/04 |
| | | | 24/663 |
| 8,087,861 B2 * | 1/2012 | Wang | B23K 1/0008 |
| | | | 411/107 |
| 8,282,329 B2 | 10/2012 | Bowers et al. | |
| 8,490,358 B2 | 7/2013 | Bowers et al. | |
| 8,745,951 B2 | 6/2014 | Bowers et al. | |
| 8,757,952 B2 | 6/2014 | Bowers et al. | |
| 8,827,614 B2 * | 9/2014 | Tseng | F16B 5/0208 |
| | | | 411/107 |
| 9,098,252 B2 | 8/2015 | Sauer | |
| 2006/0193714 A1 | 8/2006 | Werner | |
| 2006/0263172 A1 | 11/2006 | Bassani et al. | |
| 2007/0122254 A1 | 5/2007 | LaConte et al. | |
| 2013/0287486 A1 | 10/2013 | Tseng | |

* cited by examiner

FASTENER WITH A STUD HOLD-OUT POSITION

BACKGROUND OF THE INVENTION

The present invention relates to quick-connect fasteners and, more particularly, to ¼ turn fasteners which can be fastened and unfastened quickly and repeatedly.

As can be seen from Prior Art FIG. 1, fasteners 10 of the ¼ turn type have been known which include a grommet 12 and a stud 14 mounted on a first panel and a receptacle 16 mounted on a second panel. The fastener 10 holds together the two panels 18 and 20, with adjacent sides of the panels in contact with one another, by extending through openings 22 and 24 formed in the panels to receive the fastener. The grommet 12 has a cylindrical body 26 sized to extend through the opening 22 in the first panel 18, usually an outer panel, and one end of the cylindrical body 26 has a radially outward extending flange 28 to engage the outer surface of the first panel 18. The stud 14 has a shaft 30 and a head 32, and is part of a fastener assembly with the grommet 12, a cross pin 34 extending through the shaft at an end opposite to the head, a cup member 36 slidable along the shaft, and a spring on the shaft between the head and cup member and received in the cup member. The stud 14 is received in the grommet 12, with the head 32 of the stud being adjacent to the flange 28 on the grommet and a radially outward extending flange 38 on the cup member 36 engaging a radially inward extending flange 40 at the end of the grommet 12 opposite to the radially outward extending flange 28. This arrangement keeps the head 32 of the stud 14 biased by the spring slightly outward from the radially outward extending flange 28 at the outer side of the first panel 18. The cross pin 34 on the stud 14 prevents the assembly of the grommet 12 and the stud 14 from separating from the first panel 18.

The receptacle 16 of the fastener 10 has a generally cylindrical body 42 and a flange 44 projecting radially outward from one end of the body. The receptacle body 42 defines a central opening and has cam and locking surfaces 46 defined at an end opposite the radially outward extending receptacle flange 44. The receptacle flange 44 is placed against and secured to a side of the second panel 20, usually an inner panel, opposite to the side contacting the first panel 18, with the receptacle body 42 extending away from the side of the second panel 20 to which the flange is attached. The panels 18 and 20 are brought together so that the stud 14 and the receptacle 16 are in alignment. The head 32 of the stud 14 is engaged by a turning tool, such as a screwdriver, pushed inwardly against the bias of the spring, and turned ¼ turn with the cross pin 34 of the stud in engagement with the cam and locking surfaces 46 of the receptacle 16. This action locks the fastener 10 in place with the two panels 18 and 20 in secure engagement with one another.

A drawback of such a fastener is that, when the fastener is in a released position, the cross pin 34 and a significant portion of the stud shaft 30 are free to extend beyond the cup member 36 and the grommet 12 toward the second panel 20. This extension of the stud 14 and the cross pin 34 interferes with proper positioning of the first panel 18 on the second panel 20, because the extending stud and cross pin "hang up" on any of various surfaces as the portion of the fastener 10 including the stud and cross pin is being aligned with the portion of the fastener including the receptacle 16. In a "hang up", the extending stud 14 and cross pin 34 prevent proper alignment and securement of the fastener 10. In such a situation, the head 32 of the stud 14 must be pulled outward to reduce the inward extension of the stud 14 and cross pin 34, and thereby eliminate the interference of the stud and cross pin with the proper alignment of the two portions of the fastener 10. Typically, the first panel 18 is provided with a plurality of spaced fasteners 10. As a result, the placement of the first panel 18 relative to the second panel 20 becomes difficult as an installer tries to hold the first panel in position while trying to pull out the stud 14 on a plurality of fasteners 10 to eliminate interference caused by the inward extension of the studs 14 and cross pins 34. Placement of the first panel is especially difficult where the first panel 18 is a curved panel, such as an aircraft engine cowling panel.

One fastener created to ease this challenge is disclosed in U.S. Pat. No. 5,688,093 (the "'093 patent), which is incorporated herein by reference in its entirety. As can be seen in FIGS. 2 and 3, the '093 patent discloses a ¼ turn type of fastener 50 having a grommet 52, a stud 54, a receptacle 56, a cross pin 74, a cup member 76, and a locking spring 77. When the fastener 50 is released by turning the stud 54, an ejecting spring 90 expands, moving the cup member 76 upward and, with the cup member 76, moving the locking spring 77, the stud 54, and the cross pin 74 upward until the cross pin engages a bottom surface of the grommet 52. The biasing force of the locking spring 77 is greater than the biasing force of the ejecting spring 90. With the stud 54 ejected to this point, there is very little likelihood of the stud 54 or the cross pin 74 hanging up as the panel 58, with the outer portion of the fastener 50, is being aligned for engagement with the inner portion of the fastener. However, installing the stud 54 into the grommet 52 can be difficult with the ejecting spring 90 in between. Consequently, there remains room in the art for improvement.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the embodiments of the invention will be described and explained with additional specificity and detail through the use of the accompanying drawings in which.

DETAILED DESCRIPTION OF THE INVENTION

In describing particular features of different embodiments of the present invention, number references will be utilized in relation to the figures accompanying the specification. Similar or identical number references in different figures may be utilized to indicate similar or identical components among different embodiments of the present invention.

Figure 1:
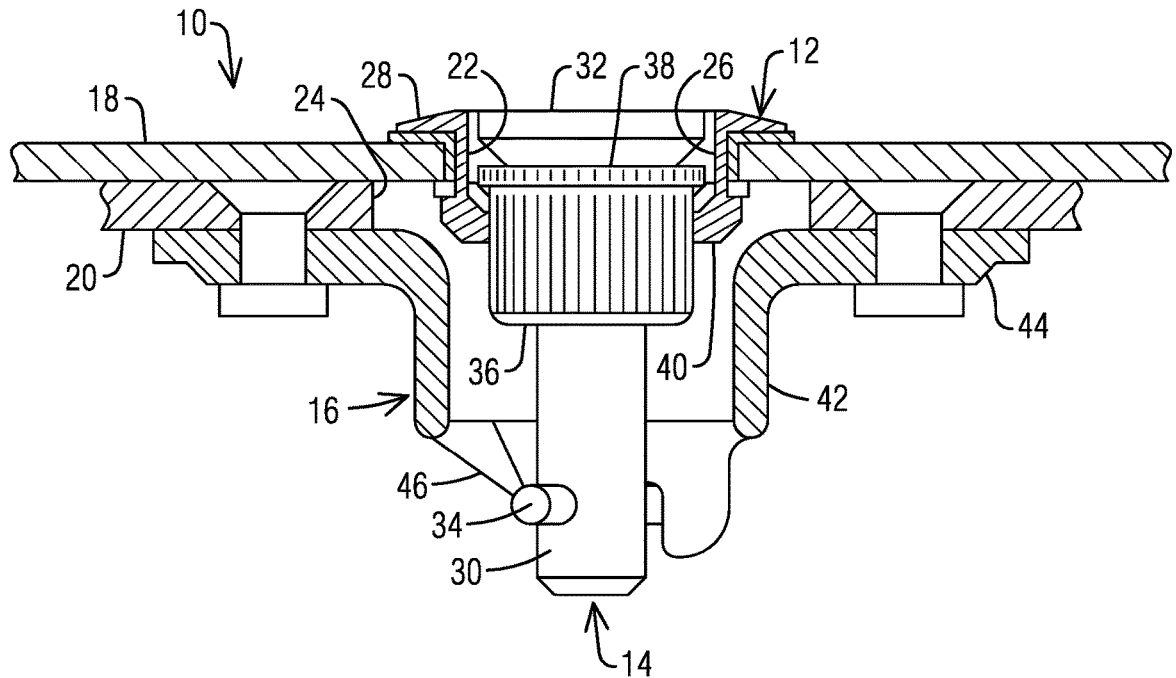
FIG. 1 is a cross section of a prior art fastener assembly holding two panels together.
Figure 2:
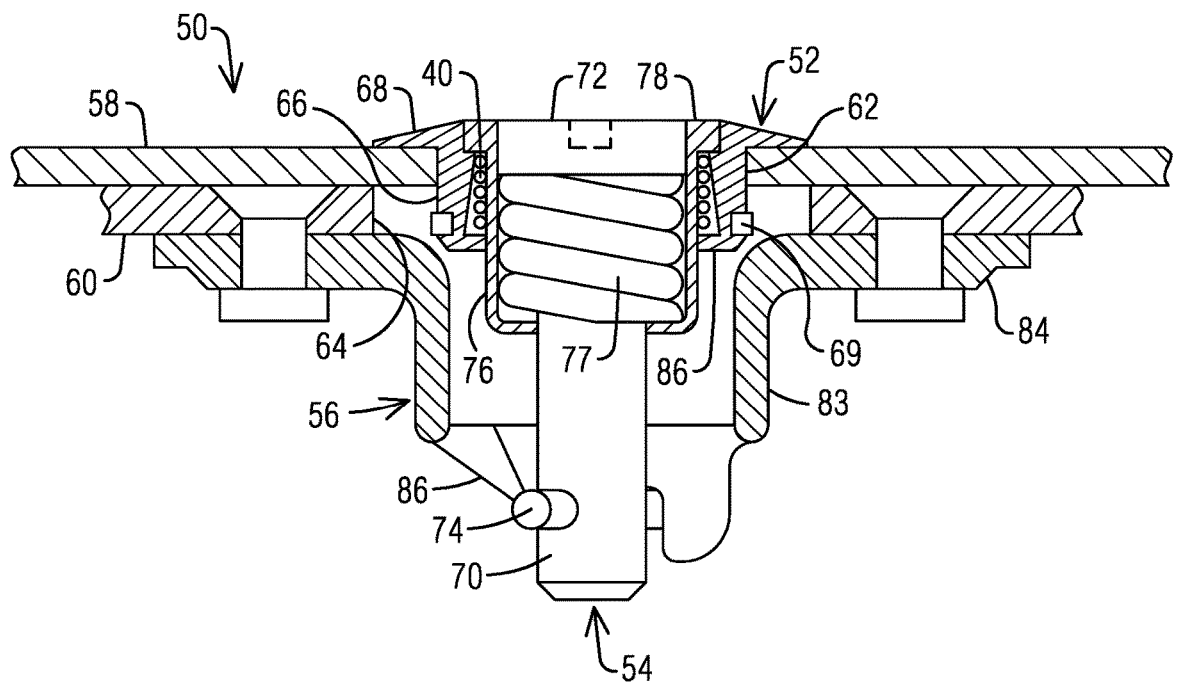
FIG. 2 is a cross section of another prior art fastener assembly holding two panels together while in the secured position.
Figure 3:
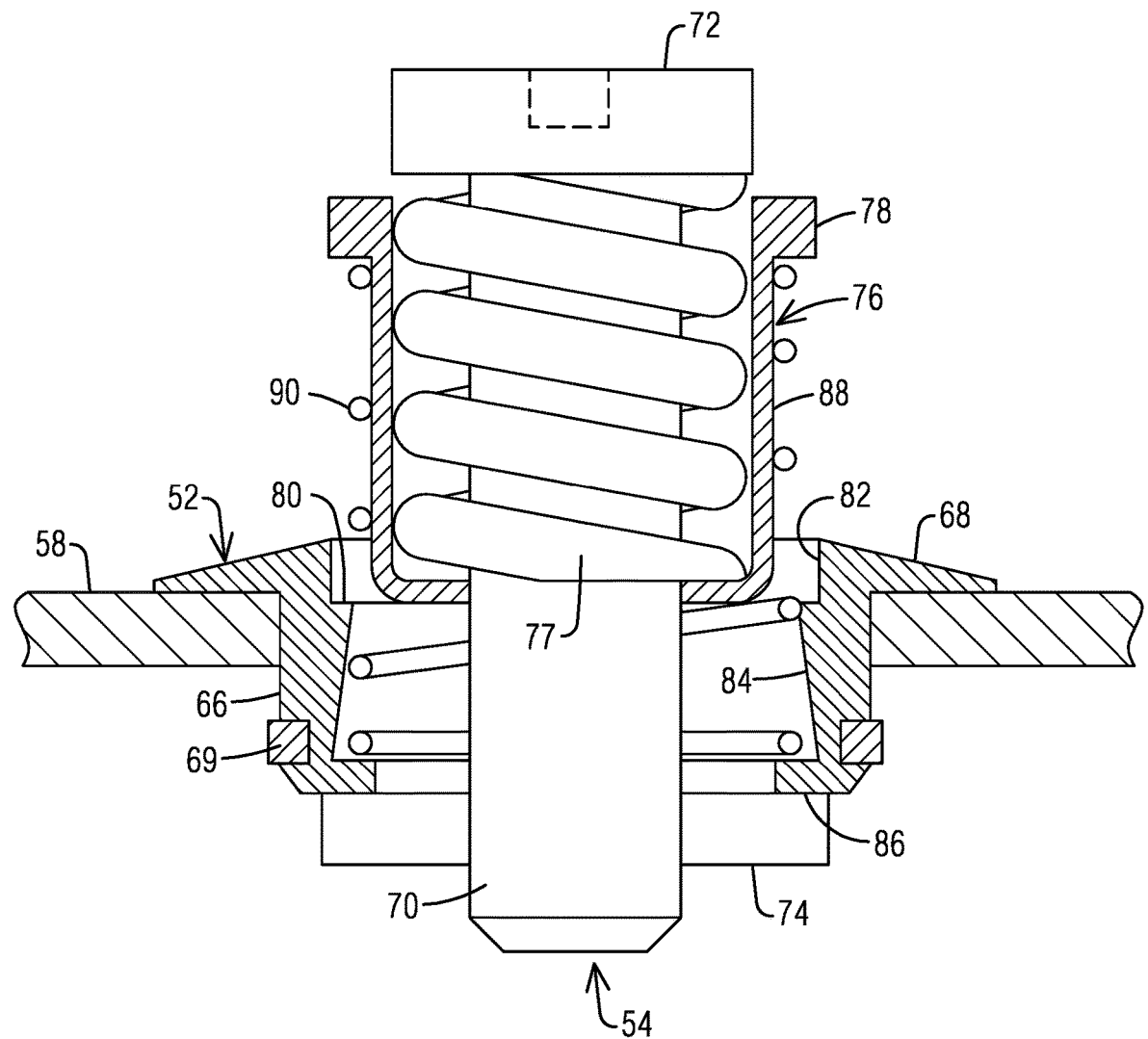
FIG. 3 is the prior art fastener assembly of FIG. 2 in a released position.
Figure 4:
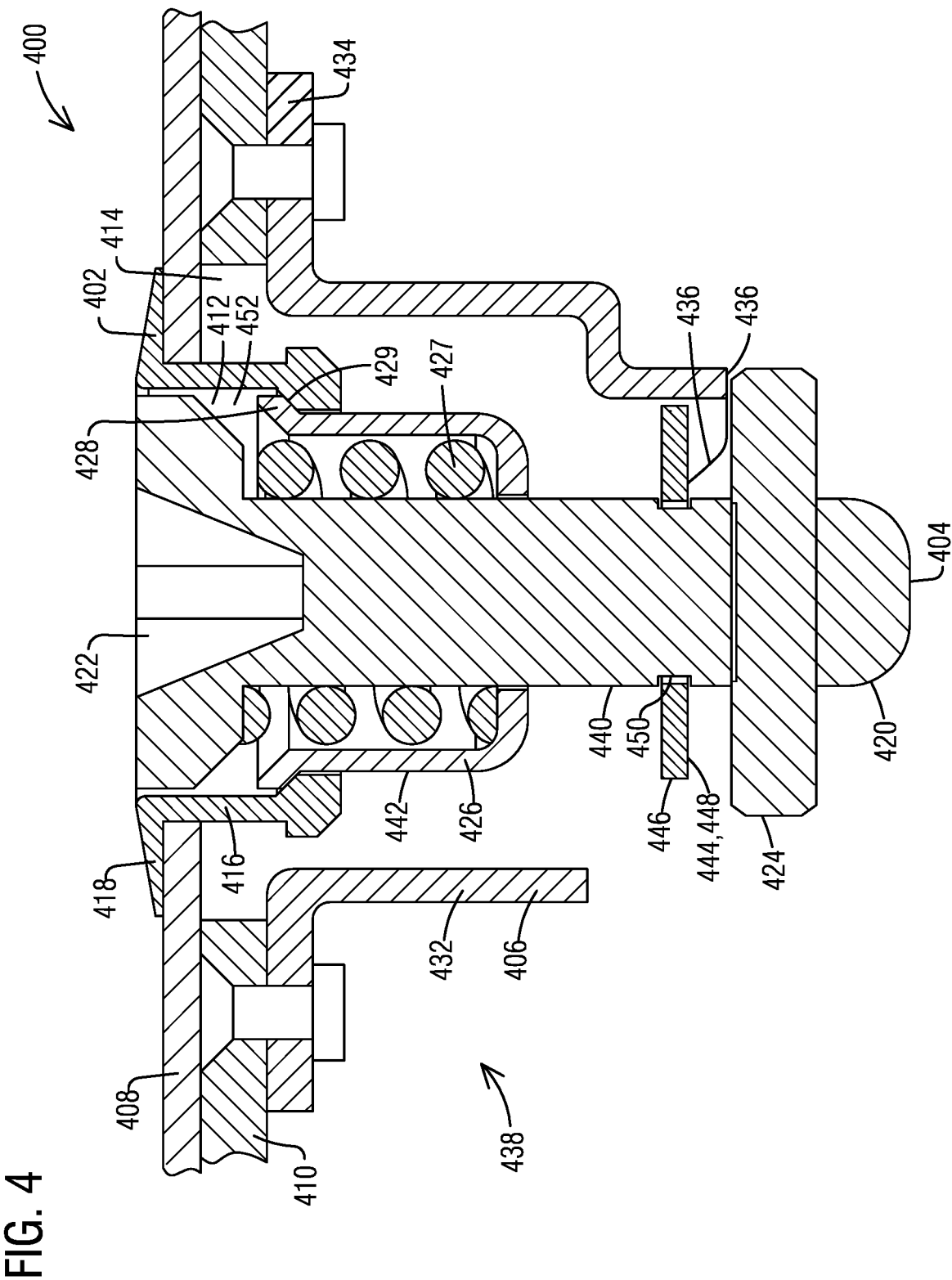
FIG. 4 is a cross section of an embodiment of a fastener assembly disclosed herein a secured position.

As can be seen from FIG. 4, an adjustable fastener assembly 400 according to the present invention is of the ¼ turn type, having a grommet 402, a stud 404, and a receptacle 406. The fastener assembly 400 holds together two panels 408 and 410, with adjacent sides of the panels 408, 410 in contact with one another, by extending through apertures 412 and 414 formed in the panels to receive the fastener assembly 400. The grommet 402 has a cylindrical body 416 (e.g. a perimetric wall) sized to extend through the aperture 412 in one of the panels 408, usually an outer panel, and one end of the cylindrical body 416 as a radially outward extending flange 418 to engage the outer surface of the outer panel 408. The stud 404 has a shaft 420, a head 422, a cross pin 424 extending through the shaft 420 at an end opposite to the head, a cup member 426 slidable along the shaft 420, and a fastener locking spring 427 on the shaft 420 between the head 422 and the cup member 426 and at least partly received in the cup member 426. The stud 404 is received in the grommet 402 with the head 422 of the stud 404 being adjacent to the flange 418 on the grommet 402 and a radially outward extending flange 428 on the cup member 426 engaging a radially inward extending flange 429 at the end of the grommet 402 opposite to the radially outward extending flange 418. This arrangement keeps the head 422 of the stud 404 biased by the fastener locking spring 427 outward from the radially inward extending flange 429. The cross pin 424 on the stud 404 prevents the assembly of the grommet 402, the stud 404, and the cup member 426 from separating from the outer panel 18.

Due to the presence of the cross pin 424 and the stiffness of the spring, a tool is required to move the cup member 426 adjacent to the head 422 by compressing the spring and hereby providing sufficient distance between the cross pin 424 and the cup member 426 so that the stud 404 can be inserted, at an angle, into the grommet 402. However, the geometry of this arrangement limits the axial length of the grommets 402 which can be used. Specifically, when the axial length of a grommet 402 reaches a certain axial length, the stud 404 cannot be inserted into the grommet even when the cup member 426 is adjacent to the head 422.

The receptacle 406 of the fastener assembly 400 has a generally cylindrical receptacle body 432 and a receptacle flange 434 projecting radially outward from one end of the body. The receptacle body 432 defines a central opening and has cam and locking surfaces 436 defined at an end opposite the radially outward extending receptacle flange 434. The receptacle flange 434 is placed against and secured to a side of the other panel 410, usually an inner panel, opposite to the side contacting the first panel 408, with the receptacle body 432 extending away from the side of the panel 410 to which the flange is attached. The panels 408 and 410 are brought together so that the stud 404 and the receptacle 406 are in alignment. The head 422 of the stud 404 is engaged by a turning tool, such as a screwdriver, pushed inwardly against the bias of the spring, and turned ¼ turn with the cross pin 424 of the stud 420 in engagement with the cam and locking surfaces 436 of the receptacle 406. This action locks the fastener assembly 400 in place with the two panels 408 and 410 in secure engagement with one another.

In addition to the receptacles described in the cited prior art, other receptacle styles may be used. For example, receptacles that use a threaded insert (sometimes referred to as a barrel) as disclosed in U.S. Pat. Nos. 5,795,122 and 8,282,329, which are incorporated herein by reference in their entirety, may be used.

In FIG. 4, the locking arrangement is in a secured configuration 438 where the stud 404 is in a stud secured position 440, the cup member is in a cup secured position 442, and a locking element 444, which is disposed on the fastener assembly 400 between the head 422 and the cross pin 424 of the stud 404, is in a locking element secured position 446 when the cross pin 424 is locked into the receptacle 406. In the secured configuration 438 the locking element 444 is disposed inward of the both panels 408, 410, (below as seen in FIG. 4), and external to an interior 452 of the grommet 402.

The secured positions are respectively relatively lower with respect to the grommet. The locking element 444 in this example is a flexible member. The flexible member is a flexible washer 448 that is disposed in a stud groove 450, is disengaged from any other surfaces, and simply rests in the locking element secured position 446 when the fastener assembly 400 is secured as shown. The flexible washer 448 may be flat or non-flat. The flexible washer 448 may be made of a compressible material such as plastic. Alternately, or in addition, the flexible washer 448 may be constructed to change shape through an internal resilience when a force is applied. In alternate embodiments, the locking element may be any sort of resilient member known to those in the art, including rings, springs, partial washers and partial rings etc. One or more locking elements 444 may be used in conjunction with each other.

In this position, the fastener locking spring 427 is compressed between the head 422 and the cup member 426. The cross pin 424 is locked into the receptacle 406. A bias of the fastener locking spring 427 in this position urges the radially outward extending flange 428 on the cup member 426 onto the radially inward extending flange 429 of the grommet 402, while the cross pin 424 urges the receptacle 406 upward, thereby holding the panels 408, 410 together. As such, when stud 404 is constrained into the stud secured position 440 the by the cam and locking surfaces 436, the fastener assembly 400 will naturally take only this secured configuration.

Figure 5:
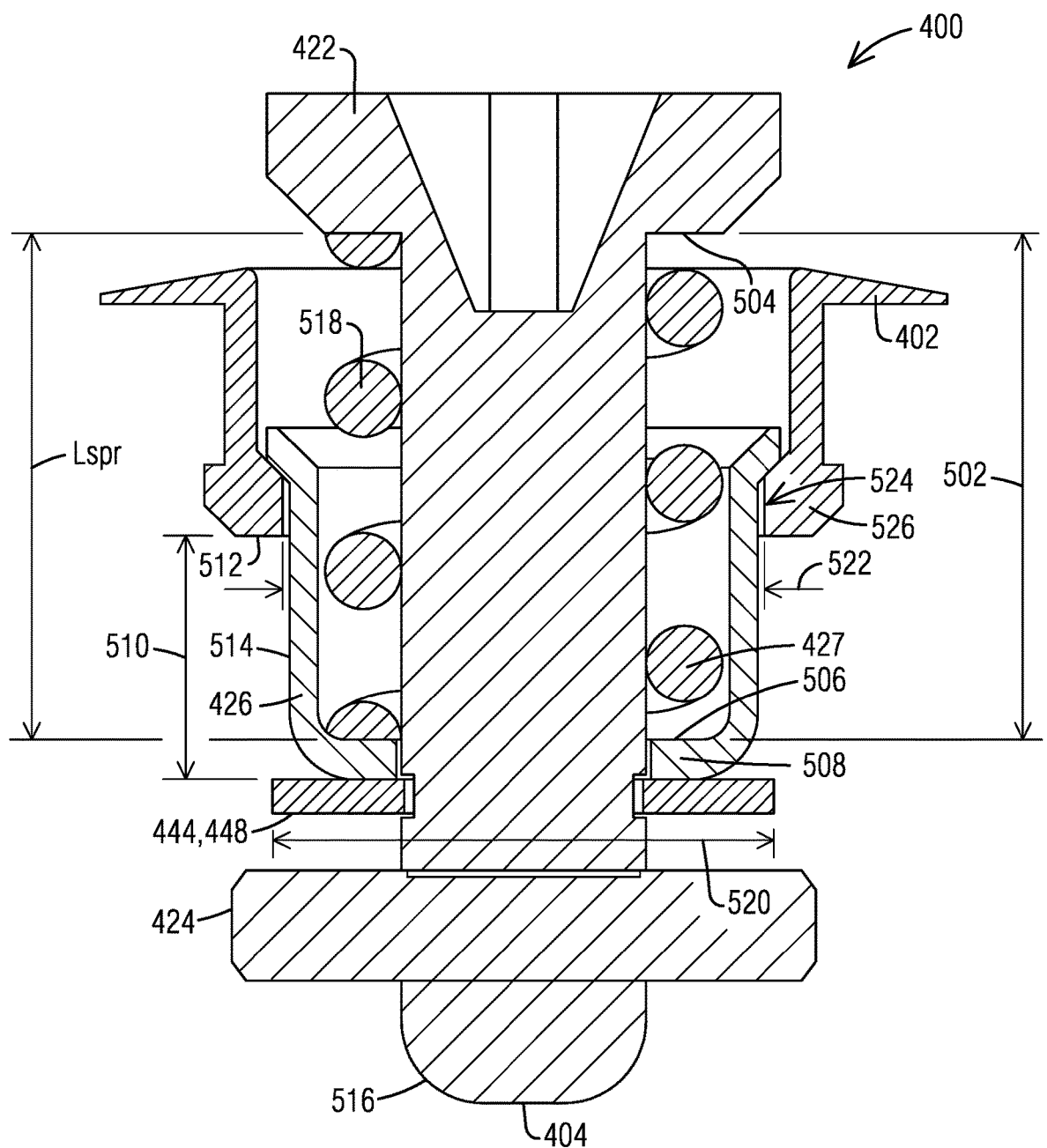
FIG. 5 is a cross section of the embodiment of FIG. 4 in an unlocked position.

In the remaining figures the panels 408, 410 and the receptacle 406 are omitted for clarity. In FIG. 5 the fastener assembly 400 is in an unlocked configuration 500 where the cross pin 424 has been disengaged from the receptacle 406. In this embodiment, the stud 404 is not constrained into the stud secured position 440 the by the cam and locking surfaces 436. Accordingly, the fastener locking spring 427 is free to expand. This expansion separates the head 422 from the cup member 426, which raises the stud 404 relative to the cup member 426 as well as the grommet 402 to an unlocked configuration. In the embodiment shown, the cup member 426 abuts the flexible washer 448 and may be under the bias of the fastener locking spring 427.

With the stud 404 released and the fastener locking spring 427 expanded, the cup member 426 is not biased downward into the grommet 402, but is instead free to move unrestrained upward relative to the grommet 402 a distance 510 until the flexible washer 448 abuts a bottom 512 of the grommet 402. The stud 404 and the fastener locking spring 427 move with the cup member 426 in the embodiment shown due to the presence of the fastener locking spring 427. Accordingly, in the embodiment shown, the cup member 426 is in one cup unlocked position 514 of a range of cup unlocked positions, the stud 404 is in one stud unlocked position 516 of a range of stud unlocked positions, and the fastener locking spring 427 is in one spring unlocked position 518 of a range of spring unlocked positions. The range is determined by the distance 510. Since the cup member 426, the stud 404, and the fastener locking spring 427 move together in this embodiment, for each cup unlocked position there is one stud unlocked position and one spring unlocked position.

In alternate embodiments, the fastener locking spring 427 is characterized by an expanded length Lspr that is less than a maximum length 502 between a bottom surface 504 of the head 422 and an upper surface 506 of a cup flange 508 when the cup member 426 abuts the flexible washer 448. This would permit the stud 404 to move freely relative to the cup member 426, and the fastener locking spring 427 to move freely with respect to the cup member 426, without compressing the fastener locking spring 427. In these alternate embodiments, for each cup unlocked position there is a range of stud unlocked positions and a range of spring unlocked positions possible even while the fastener locking spring 427 is uncompressed.

The flexible washer 448 is characterized by a washer uncompressed diameter 520 that is slightly larger than a grommet inlet diameter 522 defined by a friction surface 524 of the grommet 402 at a grommet bottom end 526. This creates an interference between the flexible washer 448 and the grommet bottom end 526 that resists upward movement of the flexible washer 448 once the flexible washer 448 reaches the bottom surface 512 of the grommet 402. The flexible washer 448 is resilient in a manner that allows the washer diameter to be reduced when force is applied, by radially inward movement and/or deflection. This force can be generated by lifting the stud 404 upward forcefully. This lifting will compress the flexible washer 448 enough to permit it to fit inside the grommet bottom end 526.

Figure 6:
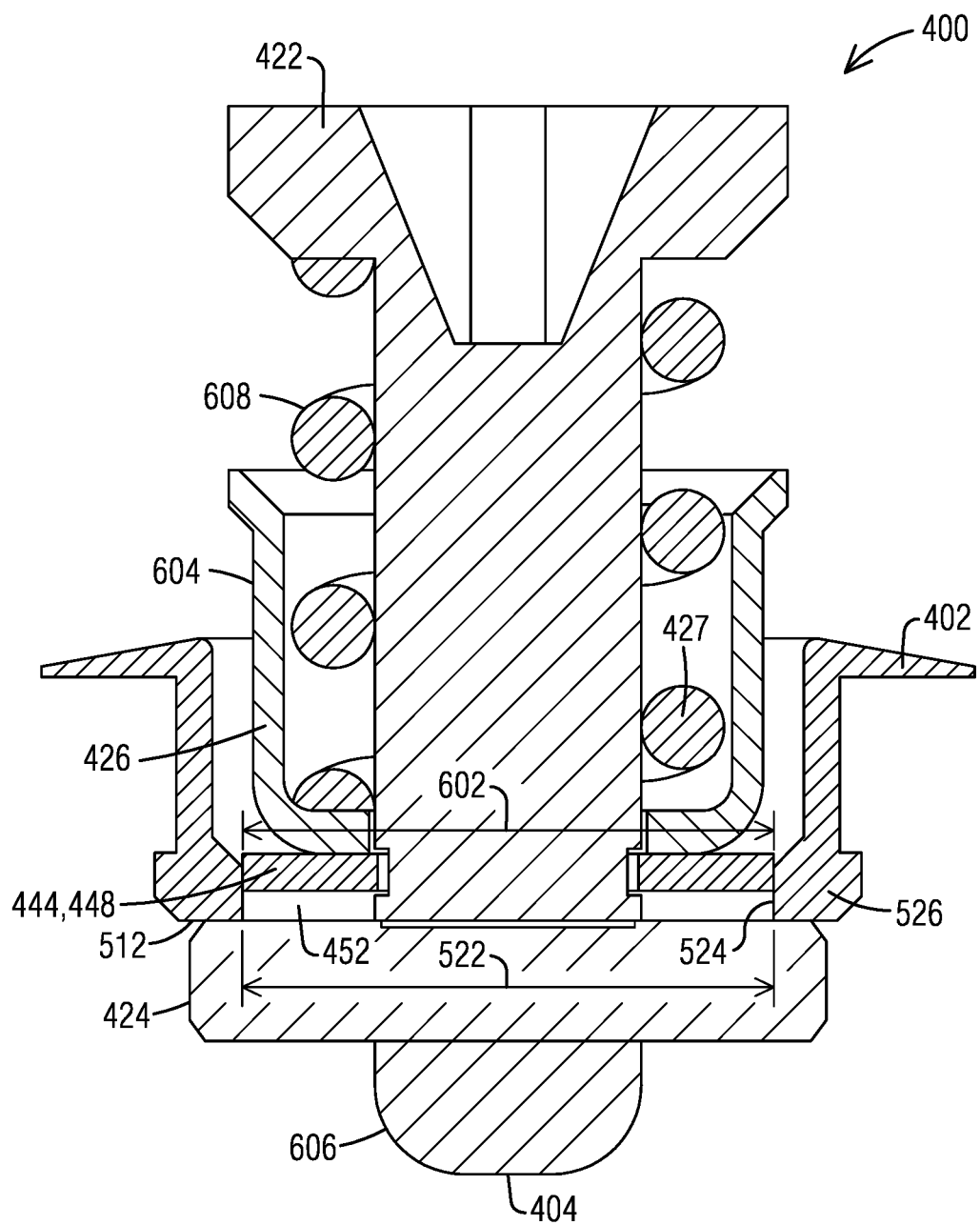
FIG. 6 is a cross section of the embodiment of FIG. 4 in a holdout position.

In FIG. 6 the fastener assembly 400 is in a holdout configuration 600 where the stud 404 has been lifted so that the flexible washer 448 is within the interior 452 of the grommet at the grommet bottom end 526. The washer is characterized by a washer compressed diameter 602. When the washer abuts the friction surface 524 of the grommet 402, the washer compressed diameter 602 equals the grommet inlet diameter 522. A frictional force there between holds the flexible washer 448 in place. This, in turn, holds the stud 404 in place. The flexible washer 448 can be held frictionally in place anywhere along the friction surface 524 of the grommet 402 so that the stud 404 may be held in a range of stud holdout positions. When the cross pin 424 abuts the bottom 512 of the grommet 402 the stud 404 can be raised no more. In this position, the stud 404 is in a maximum stud holdout position 606.

In the embodiment shown, the cup member 426 rests on the flexible washer 448 and may be under a bias of the fastener locking spring 427, so that the cup member 426 and the fastener locking spring 427 move with the stud 404. Therefore, as the stud 404 moves through the range of stud holdout positions, the cup member 426 moves through a range of cup member holdout positions, and the fastener locking spring 427 likewise moves through a range of spring holdout positions. The flat washer thereby holds the cup member 426 relative to the grommet 402. For each stud holdout position, there is one cup holdout position and one spring holdout position. Therefore, when the stud 404 is in the maximum stud holdout position 606, the cup member 426 is in a maximum cup holdout position 604 and the fastener locking spring 427 is in a maximum spring holdout position 608. When compared to the secured position, the holdout positions are respectively relatively raised with respect to the grommet 402.

In the alternate embodiments where the fastener locking spring 427 is characterized by the expanded length Lspr that is less than the maximum length 502, the cup member 426 and the fastener locking spring 427 would be able to move freely relative to the stud 404 without compressing the fastener locking spring 427. In those alternate embodiments, there would be a range of cup holdout positions and a range of fastener locking spring holdout positions for each stud holdout position even while the fastener locking spring 427 is uncompressed.

Figure 7:
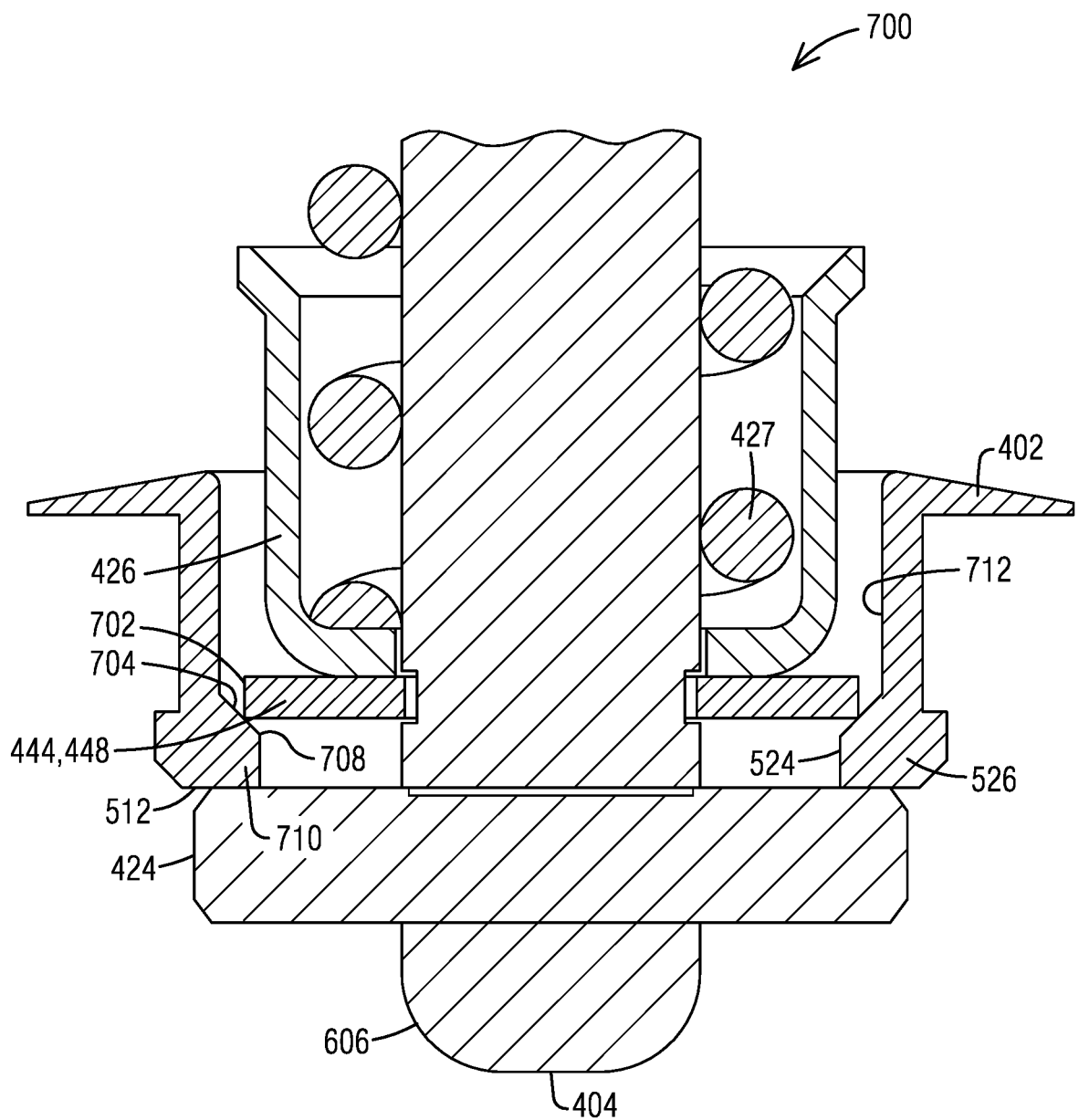
FIG. 7 is a close up of a cross section of an alternate embodiment the fastener assembly in a holdout position.

FIG. 7 shows a closeup of an alternate embodiment of a fastener assembly 700. In this embodiment, when the stud 404 is in the maximum stud holdout position 606, an outer surface 702 of the flexible washer 448 abuts a ramp 704 inside the grommet 402. The resilience of the flexible washer 448 causes the flexible washer 448 to expand radially outward once the flexible washer 448 is raised above a top corner 708 of the friction surface 524. Accordingly, in this embodiment, to reach the maximum stud holdout position 606, as the stud 404 is raised, the flexible washer 448 is first compressed to fit within the friction surface 524, and then expands partly or fully after passing the top corner 708. This creates a physical interference between the flexible washer 448 and an interference feature 710 in an inner surface 712 of the grommet 402. The interference feature 710 shown is material that supports the friction surface 524. However, any feature known to those in the art can be used, including dimples and/or ridges etc.

In an embodiment where the flexible washer 448 is biased against the ramp 704, the bias tends to also urge the stud 404 upward. This locks the stud 404 into place tightly by wedging the interference feature 710 between the cross pin 424 and the flexible washer 448. In an alternate embodiment, and/or if there is no ramp 704, the flexible washer is fully expanded once past the top corner 708. This can be designed to result a looser fit that permits slight movement between the flexible washer and the interference feature 710. In the embodiment shown the friction surface 524, the ramp 704, and the interference feature 710 are all present. In alternate embodiments, there may be only one or only two of these elements present.

Figure 8:
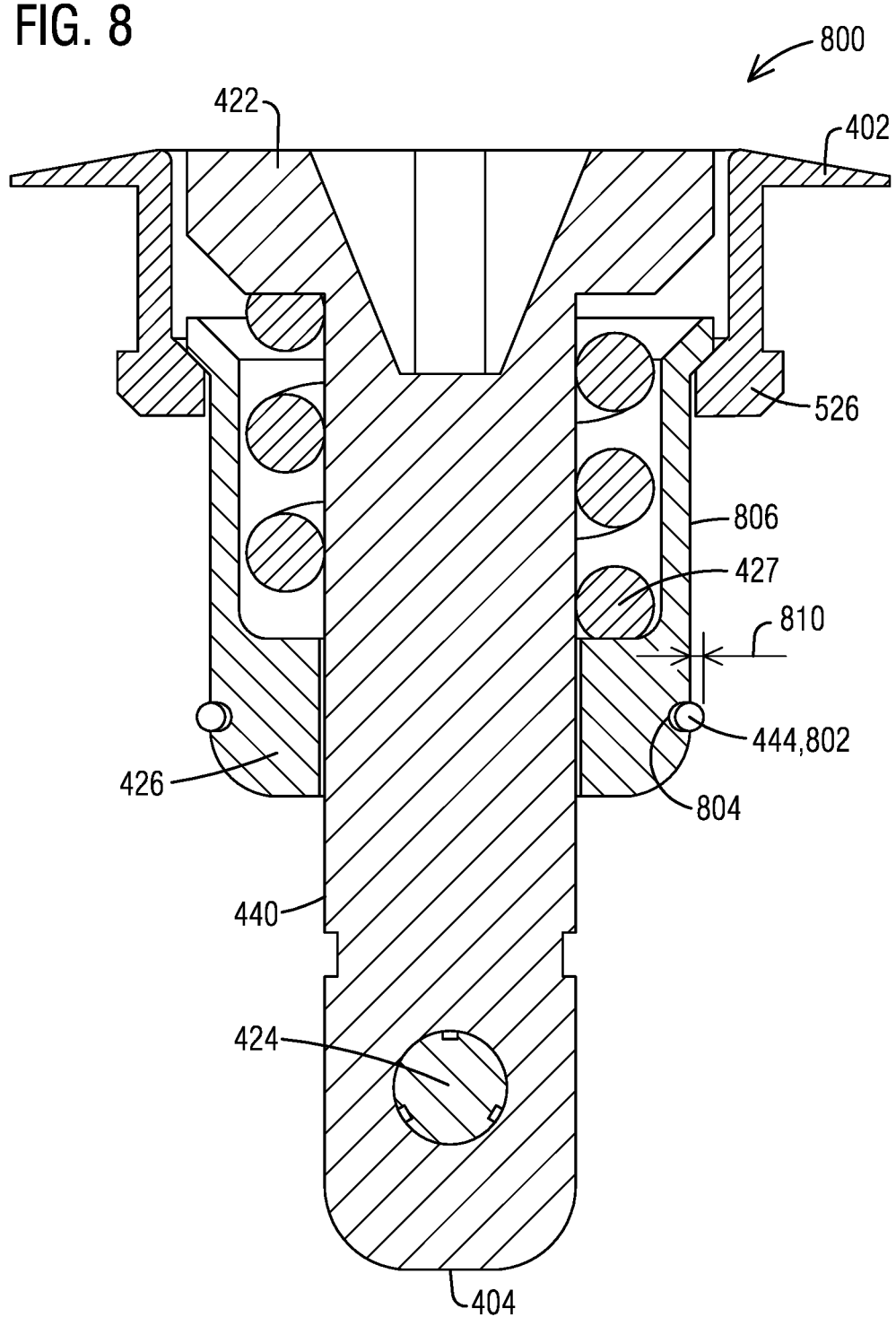
FIG. 8 is a cross section of another embodiment of the fastener assembly in a secured position.

FIG. 8 shows a cross section of an alternate embodiment of the fastener assembly 800 where the locking element 444 is a flexible ring 802 as opposed to the flexible washer 448. The flexible ring 802 is disposed in a cup groove 804 on an exterior surface 806 of the cup member 426. The flexible ring 802 may be embodied as a wire clip, a wire ring, a rubber O-ring, or any other element known to those of ordinary skill in the art that may change shape or diameter etc. in response to radially applied force in order to fit inside the grommet bottom end 526 in a friction fit.

Figure 9:
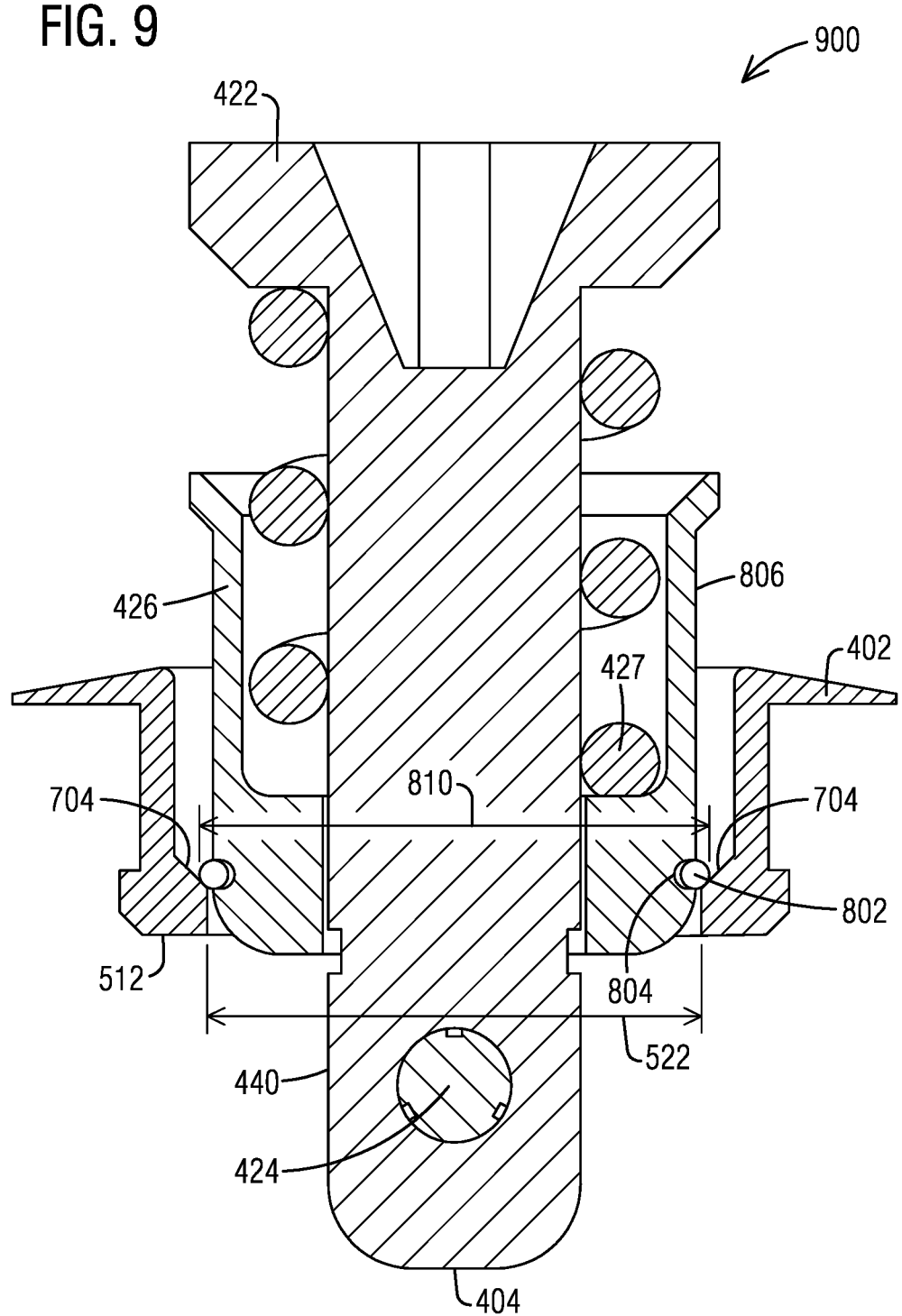
FIG. 9 is a cross section of the embodiment of FIG. 8 in a holdout position.

As can be seen in FIG. 9, similar to the flexible washer 448, when the stud 404 is in the stud secured position 440 the flexible ring 802 is characterized by an uncompressed diameter 810 that is larger than the grommet inlet diameter 522. As the stud 404 is raised the flexible ring 802 is compressed into the grommet bottom end 526. Once inside, the friction between the flexible ring 802 and the friction surface 524 is sufficient to hold the stud 404 in place anywhere along the friction surface. In the embodiment shown the cross pin 424 is located sufficiently far from the cup groove 804 that the flexible ring 802 may be moved to the ramp 704 and even beyond, at which point the flexible ring 802 may partly or fully decompress, thereby locking the stud 404 in a holdout position. In the embodiment shown, the stud 404 does not reach the maximum stud holdout position 606, where the cross pin 424 abuts the bottom 512 of the grommet 402, until the flexible ring 802 is raised above the ramp 704. Such a configuration enables, for example, replacement of the flexible ring 802 without disassembly of the fastener assembly 800.

In light of the above, it can be seen that the Inventors have developed a novel and innovative fastener assembly that allows for a locked configuration, an unlocked configuration having a range of unlocked positions, and a holdout configuration having a range of holdout positions. This functionality is made possible by merely adding a groove to the existing stud or cup member and using an associated locking element. This provides flexibility not present in the prior art.

This written description uses examples to disclose embodiments of the invention, including the best mode, and also to enable any person skilled in the art to make and use the embodiments of the invention. The patentable scope of the embodiments of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A fastener assembly for holding together a first element and a second element, wherein each element has an aperture for receiving the fastener assembly, comprising:
   a grommet for extending through the aperture of the first element, the grommet comprising a perimetric wall defining an opening through the grommet;
   a stud comprising a head at one end and a cross pin adjacent to an opposite end, the stud being received in the opening of the grommet;
   a cup member interposed between the stud and the grommet, the cup member being moveable relative to the stud and movable relative to the grommet; and
   a locking element that is moveable relative to the grommet;
   wherein when the fastener arrangement is in a secured configuration the stud, the cup member, and the locking element are in respective secured positions that are relatively lowered with respect to the grommet and the locking element is disengaged from the grommet, and wherein when the fastener arrangement is in a holdout configuration the stud, the cup member, and the locking element are in respective holdout positions that are relatively raised with respect to the grommet and the locking element is engaged with the grommet.

2. The fastener assembly of claim 1, wherein when the fastener arrangement is in the holdout configuration the locking element maintains the cup member relatively raised with respect to the grommet.

3. The fastener assembly of claim 1, wherein when the fastener arrangement is in an unlocked configuration between the secured configuration and the holdout configuration the stud, the cup member, and the locking element are free to move relative to the grommet.

4. The fastener assembly of claim 1, the locking element comprising a flexible member that is compressed to frictionally engage the locking element with a friction surface on an inner side of the perimetric wall when the fastener arrangement is in the holdout configuration.

5. The fastener assembly of claim 4, the flexible member comprising a flat washer secured to the stud and which frictionally engages the friction surface when the fastener arrangement is in the holdout configuration.

6. The fastener assembly of claim 4, the flexible member comprising a ring secured to an exterior surface of the cup member and which frictionally engages the friction surface when the fastener arrangement is in the holdout configuration.

7. The fastener assembly of claim 4, further comprising a fastener locking spring configured to bias the head and the cup member apart, the fastener locking spring thereby supporting the stud in the relatively raised stud secured position when the fastener arrangement is in the holdout configuration.

8. The fastener assembly of claim 7, wherein the fastener locking spring biases the cross pin against a bottom of the grommet when the fastener arrangement is in the holdout configuration.

9. The fastener assembly of claim 1, the grommet comprising an interference feature in an inner side of the perimetric wall, the locking element comprising a flexible member that is compressed and then at least partly released to engage the interference feature in an interference fit to reach the holdout configuration.

10. The fastener assembly of claim 9, the flexible member comprising a flat washer secured to the stud and which engages the interference feature.

11. The fastener assembly of claim 9, the flexible member comprising a ring secured to an exterior surface of the cup member and which engages the interference feature.

12. The fastener assembly of claim 9, further comprising a fastener locking spring configured to bias the head and the cup member apart, the fastener locking spring thereby supporting the stud in the relatively raised stud secured position when the fastener arrangement is in the holdout configuration.

13. The fastener assembly of claim 12, wherein the fastener locking spring biases the cross pin against a bottom of the grommet when the fastener arrangement is in the holdout configuration.

14. The fastener assembly of claim 9, the interference feature comprising a ramp that cooperates with the flexible member to urge the flexible member relatively upward with respect to the grommet when the flexible member is partly released.

15. The fastener assembly of claim 9, the cup member comprising a flange that engages the interference feature when the cup member is in the secured configuration.

16. The fastener assembly of claim 1, further comprising a receptacle for mounting in the aperture of the second element.

17. The fastener assembly of claim 1, wherein the opening of the grommet comprises an upper diameter and a lower diameter, wherein the lower diameter is smaller than the upper diameter, and wherein the locking element comprises a resilient material comprising a diameter that is larger when uncompressed than the lower diameter of the grommet and configured to deform to fit within the interior of the cup member when the fastener assembly is in the holdout configuration.

18. The fastener assembly of claim 1, wherein the locking element is disposed on a shaft of the stud.

19. The fastener assembly of claim 1, wherein the locking element is disposed on an exterior surface of the cup member.

20. A fastener assembly for holding together a first element and a second element, wherein each element comprises an aperture for receiving the fastener assembly, comprising:
- a grommet for extending through the aperture of the first element, the grommet comprising a perimetric wall defining an opening through and an interior of the grommet;
- a stud comprising a head at one end and a cross pin adjacent to an opposite end, the stud being received in the opening of the grommet;
- a spring on the stud between the head and cross pin;
- a cup member interposed between the stud and the grommet, the cup member being moveable relative to the stud and movable relative to the grommet, wherein at least a portion of the spring is disposed within the cup; and
- a locking element that is moveable relative to the grommet, wherein the locking element is disposed on the fastener assembly between the head and cross pin of the stud;
- wherein when the fastener assembly is in a secured configuration the locking element is disposed inward of the first element and of the second element and external to the interior of the grommet, and wherein when the fastener assembly is in a holdout configuration at least a portion of the locking element is disposed within the interior of the grommet and engaging an interior surface of the grommet.

\* \* \* \* \*